Dec. 15, 1931.  E. C. COLYER  1,836,450
CLUTCH
Filed July 8, 1929
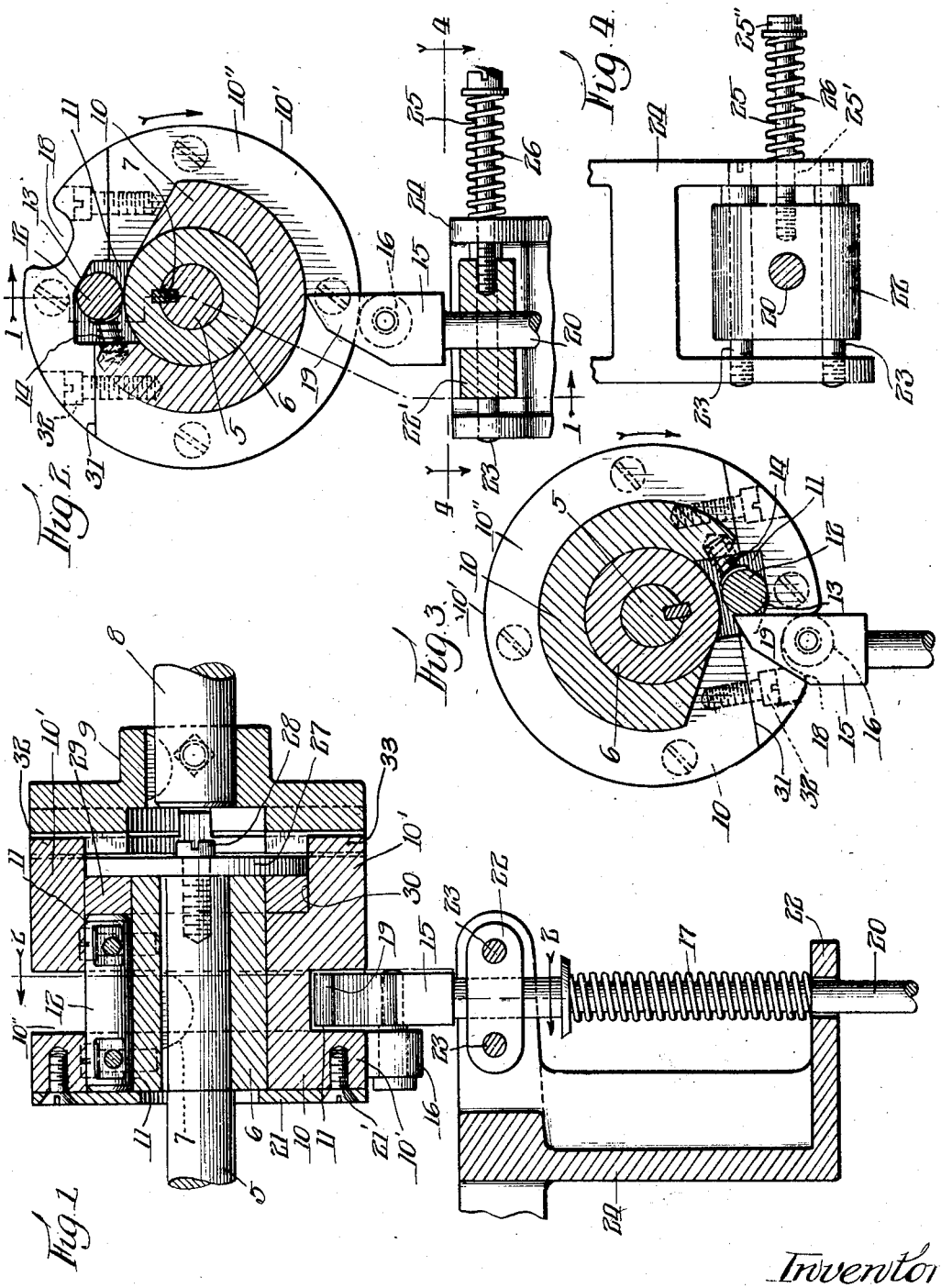
Inventor
Edwin C. Colyer,
By Wm. O. Bell atty.

Patented Dec. 15, 1931

1,836,450

UNITED STATES PATENT OFFICE

EDWIN C. COLYER, OF CHICAGO, ILLINOIS, ASSIGNOR TO ADDRESSOGRAPH COMPANY, OF CHICAGO, ILLINOIS, A CORPORATION OF DELAWARE

CLUTCH

Application filed July 8, 1929. Serial No. 376,531.

This invention relates to improvements in clutches and its object is to provide a quick acting clutch suitable for use in addressing, printing and other machines which are required to be operated at a relatively high rate of speed and to be frequently and quickly started and stopped.

A further object of the invention is to provide a clutch of strong and substantial construction which is adapted to resist the wear and tear of many operations at high speed.

Other objects of the invention will appear hereinafter.

In the accompanying drawings illustrating a selected embodiment of the invention Fig. 1 is a sectional view of a clutch on the line 1—1 of Fig. 2;

Fig. 2 is a sectional view on the line 2—2 of Fig. 1, showing the clutch parts engaged;

Fig. 3 is a sectional view similar to Fig. 2 but showing the clutch parts disengaged; and Fig. 4 is a sectional view on the line 4—4 of Fig. 2.

Referring to the drawings the drive shaft 5 has a sleeve 6 secured thereon by key 7. The driven shaft 8 which extends to whatever mechanism is to be driven, has a flanged collar 9 forming a part of a coupling for permanent connection to the driven member of the clutch. The drive shaft 5 is connected to a source of power which rotates said shaft continuously. A clutch collar 10 surrounds the sleeve 6 and is rotatable thereon. The clutch collar 10 has two flanges 10′ which are spaced apart to provide between them an annular groove or channel 10″ within which end 19 of the trip dog 15 is positioned. The flanges have opposite recesses 11 which are cut through the body of the clutch collar so as to expose a portion of the periphery of the sleeve 6. A clutch roller 12 is positioned with its ends in these recesses and extends across the groove 10″ substantially parallel with the axis of the drive shaft. The roller is movable in the recesses 11, but the recesses have beveled surfaces 13 which narrow the width of the end portions of the recesses. A pair of springs 14 normally urge the clutch roller into these narrowed portions and wedge the roller between the beveled surfaces 13 and the sleeve 6, thereby forming a clutching connection between the clutch collar and the sleeve. This drives the clutch collar in the same direction as the shaft, as indicated by the arrows in Figs. 2 and 3.

The trip dog 15 is movable in a radial direction with respect to the shaft 5 and for this purpose is mounted in the bearings 22 and 22′ in the frame 24 of the machine. The trip dog is normally urged into the path of the clutch roller by means of the spring 17 on the rod 20. It is held out of engagement with the clutch roller, however, by means of an antifriction roller 16 which is mounted on the trip dog 15 and which rides on the periphery of one of the flanges 10′ of the clutch collar. Adjacent the clutch roller, however, the clutch collar flange has a notch 18 into which the roller 16 is projected by the spring 17 when the notch reaches the roller 16, Fig. 3. This projects the end 19 of the trip dog into position to be struck by the clutch roller 12 which kicks the clutch roller against the tension of the springs 14 and moves it out of wedging engagement with the sleeve 6 and the beveled surface 13, thus disconnecting the clutch collar from sleeve 6 and stopping the rotation of the clutch collar. The parts will remain in this condition until the operator, by means of a foot lever or other suitable mechanism connected to the rod 20, withdraws the trip dog from engagement with the roller, whereupon the springs 14 again force the clutch roller into wedging engagement with the sleeve 6 and the beveled surface 13, thereby again clutching the parts in driving relation. The clutch collar will thus be driven one revolution and then automatically disconnected. If the operator desires to operate the machine continuously the trip dog may be held out of engagement with the clutch roller.

This clutch is intended for use more particularly in addressing machines operating at a comparatively high speed, hence when the clutch roller strikes the trip dog it imparts quite a blow to the trip dog. In order to absorb the shock of this blow the upper bearing 22′ of the rod 20 is mounted to slide on the guide rods 23 which are mounted in the frame 24 of the machine. The bearing has a bolt 25 which extends loosely through a hole 25' in the frame and carries a coiled compression spring 26 between its head 25" and the frame. Thus when the trip dog is struck by the clutch roller the shock of the blow will be absorbed by the spring 26.

The clutch collar 10 is held against endwise movement on the sleeve 6 by means of the end plate 21 and the washer 27. The end plate 21 is secured to the face of one of the clutch collar flanges 10' by means of the screws 21'. The washer 27 is fastened to the end of the drive shaft 5 by means of the bolt 28 and a bearing ring 29 is positioned in a recess 30 in the clutch collar between the washer 27 and the bottom of this recess. The end plate 21 and bearing ring 29 also serve to hold the clutch roller against endwise movement in the recesses 11.

The clutch roller and the beveled surface 13 of the recesses are subject to the most wear, and are preferably hardened for this purpose. However, the portions of the clutch collar flanges which contain the beveled surfaces are made as removable sectors separable from the flanges on the line 31 and held in position by the screws 32. Thus these parts are readily replaceable when worn without the necessity of disassembling the entire clutch.

One flange 10' of the clutch collar is extended laterally beyond the end of shaft 5 and is provided with teeth and notches 33 for engagement with corresponding notches and teeth on the driven shaft collar 9 to form a suitable coupling between the clutch collar and the driven shaft.

I am aware that changes may be made in construction and arrangement of parts without departing from the spirit of the invention and I reserve the right to make such changes as fairly fall within the scope of the appended claims.

I claim:

1. The combination of a drive shaft and a driven shaft, a sleeve on the drive shaft, a clutch collar rotatably mounted on said sleeve and having recesses with inclined faces, a clutch roller in said recesses, a spring normally urging the clutch roller into wedging relation to said inclined surfaces and said sleeve, to clutch the collar to the sleeve, and means movable radially to the drive shaft for releasing the clutch roller from wedging engagement to permit the rotation of the drive shaft independently of the clutch collar.

2. In the combination of a drive member, a driven member surrounding said drive member, a clutch roller for engaging the driven member with the drive member for rotation therewith, a tripping device movable radially into the path of movement of said clutch roller and adapted to be engaged by the clutch roller for disengaging it from the drive member, and means holding said tripping device out of engagement with the clutch roller during a cycle of rotation of the driven member.

3. The combination of a drive member a clutch collar on the drive member, a clutch roller carried by said collar, springs wedging the roller into engagement with the drive member and the clutch collar, a trip device movable radially into the path of movement of said clutch roller, and means for projecting the trip device into engagement with the roller to disengage the roller from said drive member.

4. The combination of a drive member, a driven collar on said drive member having an annular groove in its periphery, a clutch roller carried by said collar extending across said groove, springs urging the roller into engagement with said drive member, and a trip device adapted to be projected into said groove to engage the roller and disengage the roller from the drive member.

5. The combination of a drive member, a collar rotatable on the drive member and having spaced flanges forming a groove therebetween, said flanges having inclined recesses adjacent said drive member, a clutch roller positioned in said recesses and lying across said groove, spring means holding said roller into wedging engagement between said inclined recesses and the drive member, and a trip device movable into said groove to engage the roller and disengage the roller from the drive member.

6. The combination of a drive member, a collar rotatable on the drive member and having spaced flanges forming a groove therebetween, said flanges having inclined recesses adjacent said drive member, a clutch roller positioned in said recesses and lying across said groove, spring means holding said roller into wedging engagement between said inclined recesses and the drive member, a trip device movable into said groove to engage the roller, and means controlled by the rotation of the clutch collar for moving said trip device into engagement with the roller.

7. The combination of a rotary drive member, a clutch collar on said drive member, a clutch roller carried by the clutch collar for engagement with the drive member and clutch collar to form a driving connection, a trip device for disengaging the clutch roller to release the clutch collar, and means automatically controlled by the clutch collar for engaging the clutch roller during the rotation of the clutch collar.

8. The combination of a rotary drive member, a clutch collar on said drive member, a clutch roller carried by the clutch collar for engagement with the drive member and clutch collar to form a driving connection, a trip device for disengaging the clutch roller to release the clutch collar, means automatically controlled by the clutch collar for engaging the clutch roller during the rotation of the clutch collar, and a shock absorber connected to said trip device for absorbing the shock when the trip device engages the roller.

9. The combination of a drive member, a clutch collar mounted thereon and having annular flanges spaced apart to form a groove therebetween and having recesses, said flanges having removable portions intersecting said recesses, a clutch roller in said recesses extending across said groove, and means for fastening the removable portions of said flanges in position.

EDWIN C. COLYER.